(12) United States Patent
Ai et al.

(10) Patent No.: US 12,124,855 B2
(45) Date of Patent: Oct. 22, 2024

(54) TRAINING METHOD FOR PARAMETER CONFIGURATION MODEL, PARAMETER CONFIGURATION METHOD, AND PARAMETER CONFIGURATION DEVICE

(71) Applicant: SHENZHEN MICROBT ELECTRONICS TECHNOLOGY CO., LTD., Guangdong (CN)

(72) Inventors: Guo Ai, Guangdong (CN); Haifeng Guo, Guangdong (CN); Zuoxing Yang, Guangdong (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/692,643

(22) PCT Filed: Sep. 15, 2022

(86) PCT No.: PCT/CN2022/119032
§ 371 (c)(1),
(2) Date: Mar. 15, 2024

(87) PCT Pub. No.: WO2023/040962
PCT Pub. Date: Mar. 23, 2023

(65) Prior Publication Data
US 2024/0264843 A1 Aug. 8, 2024

(30) Foreign Application Priority Data
Sep. 18, 2021 (CN) .......................... 202111096849.X

(51) Int. Cl.
*G06F 1/24* (2006.01)
*G06F 9/4401* (2018.01)
*G06F 8/65* (2018.01)

(52) U.S. Cl.
CPC .............. *G06F 9/4401* (2013.01); *G06F 8/65* (2013.01)

(58) Field of Classification Search
CPC ...................................................... G06F 9/4401
(Continued)

(56) References Cited

U.S. PATENT DOCUMENTS

| 11,887,583 B1 * | 1/2024 | Strimel .................... G10L 15/16 |
| 11,994,999 B2 * | 5/2024 | Baruch ................. G06F 12/121 |

(Continued)

FOREIGN PATENT DOCUMENTS

| CN | 108733540 A | 11/2018 |
| CN | 111582604 A | 8/2020 |

(Continued)

*Primary Examiner* — Volvick Derose
(74) *Attorney, Agent, or Firm* — Dickinson Wright PLLC

(57) ABSTRACT

The present disclosure relates to a training method for a parameter configuration model, a parameter configuration method, and a parameter configuration device. The training method includes: obtaining a training sample set of a data processing device, wherein the training sample set includes operation parameters and benefit parameters in one-to-one correspondence with the operation parameters, the operation parameter includes at least one of a global operation parameter or a local operation parameter associated with position distribution, the benefit parameter is configured to reflect a ratio of power consumption to computing power of the data processing device; training the parameter configuration model based on the training sample set, wherein the operation parameter is configured as an input of the parameter configuration model, and the benefit parameter is configured as an output of the parameter configuration model; and in a case that a training accuracy of the parameter configuration (Continued)

model is greater than or equal to a first preset accuracy, ending the training and obtaining a trained parameter configuration model.

20 Claims, 7 Drawing Sheets

(58) Field of Classification Search
USPC .......................................................... 713/100
See application file for complete search history.

(56) References Cited

U.S. PATENT DOCUMENTS

| | | | |
|---|---|---|---|
| 2010/0076915 A1* | 3/2010 | Xu | G06N 3/063 |
| | | | 706/25 |
| 2016/0226253 A1* | 8/2016 | Abido | H02J 3/381 |
| 2019/0303750 A1* | 10/2019 | Kumar | G06F 7/5443 |
| 2019/0304849 A1 | 10/2019 | Cheong et al. | |
| 2021/0028999 A1* | 1/2021 | Balakrishnan | G06T 17/00 |
| 2021/0240615 A1* | 8/2021 | Sohn | G06F 12/0284 |
| 2022/0011848 A1* | 1/2022 | Belagal Math | G09G 3/20 |
| 2024/0176584 A1* | 5/2024 | Chen | G06F 7/523 |

FOREIGN PATENT DOCUMENTS

| | | |
|---|---|---|
| CN | 111722696 A | 9/2020 |
| CN | 112327711 A | 2/2021 |
| CN | 112506649 A | 3/2021 |
| WO | 2021103135 A1 | 6/2021 |
| WO | 2021175058 A1 | 9/2021 |

\* cited by examiner

TRAINING METHOD FOR PARAMETER CONFIGURATION MODEL, PARAMETER CONFIGURATION METHOD, AND PARAMETER CONFIGURATION DEVICE

CROSS REFERENCE TO RELATED APPLICATIONS

This application is a national stage of International Application No. PCT/CN2022/119032, filed on Sep. 15, 2022, which claims priority to Chinese Patent Application No. 202111096849.X, filed on Sep. 18, 2021 and entitled "TRAINING METHOD FOR PARAMETER CONFIGURATION MODEL, PARAMETER CONFIGURATION METHOD, AND PARAMETER CONFIGURATION DEVICE". Both of the aforementioned applications are hereby incorporated by reference in their entireties.

TECHNICAL FIELD

The present disclosure relates to the technical field of computing, and is particular, to a training method for a parameter configuration model, a parameter configuration method, and a parameter configuration device.

BACKGROUND

With the advancement of technologies, various data processing devices with super computing power (for example, a computing device will a conventional CPU processor architecture, a device with a CPU+GPU heterogeneous computing architecture, and a computing device with hash as computing power) have emerged to be applied to various fields of need. Typically, the higher computing power of the data processing device is, the higher power consumption the data processing device needs. To optimize the efficiency as much as possible, it is expected to increase the computing power of the data processing device and meanwhile to reduce the power consumption of the data processing device as much as possible, so as to obtain an optimal ratio of power consumption to computing power (power cost consumed per unit of computing power).

SUMMARY

According to a first aspect of the present disclosure, there is provided a training method for a parameter configuration model of a data processing device, including:
  obtaining a training sample set of the data processing device, wherein the training sample set includes operation parameters and benefit parameters in one-to-one correspondence with the operation parameters, the operation parameter includes at least one of a global operations parameter or a local operation parameter associated with position distribution, and the benefit parameter is configured to reflect a ratio of power consumption to computing power of the data processing device;
  training the parameter configuration model based on the training sample set, wherein the operation parameter is configured as an input of the parameter configuration model, and the benefit parameter is configured as an output of the parameter configuration model; and
  in a case that a training accuracy of the parameter configuration model is greater than or equal to a fast preset accuracy, ending the training and obtaining a trained parameter configuration model.

According to a second aspect of the present disclosure, there is provided a parameter configuration method for a data processing device, including:
  determining an optimized operation parameter according to a parameter configuration model, cost information, and benefit information, wherein the parameter configuration model includes a parameter configuration model trained by using the above framing method; and
  configuring the data processing device to operate according to the determined optimized operation parameter.

According to a third aspect of the present disclosure, there is provided a parameter configuration device, including a memory, a processer, and instructions stored in the memory, when the instructions are executed by the processor, steps of the above training method and/or steps of the above parameter configuration method are implemented.

According to a fourth aspect of the present disclosure, there is provided a non-transitory computer-readable storage medium with instructions stored thereon, when the instructions are executed by a processor, steps of the above training method and/or steps of the above parameter configuration method are implemented.

According to a fifth aspect of the present disclosure, there is provided a computer program product including instructions, when the instructions are executed by a processor, steps of the above training method and/or steps of the above parameter configuration method are implemented.

Through the following detailed descriptions of exemplary embodiments of the present disclosure with reference to the accompanying drawings, other features and advantages of the present disclosure will become clear.

BRIEF DESCRIPTION OF THE DRAWINGS

The accompanying drawings constituting a part of the description illustrate embodiments of the present disclosure and are used for explaining the principle of the present disclosure together with the description.

The present disclosure may be understood more clearly according to the following detailed description with reference to the accompanying drawings, wherein.

Figure 1:
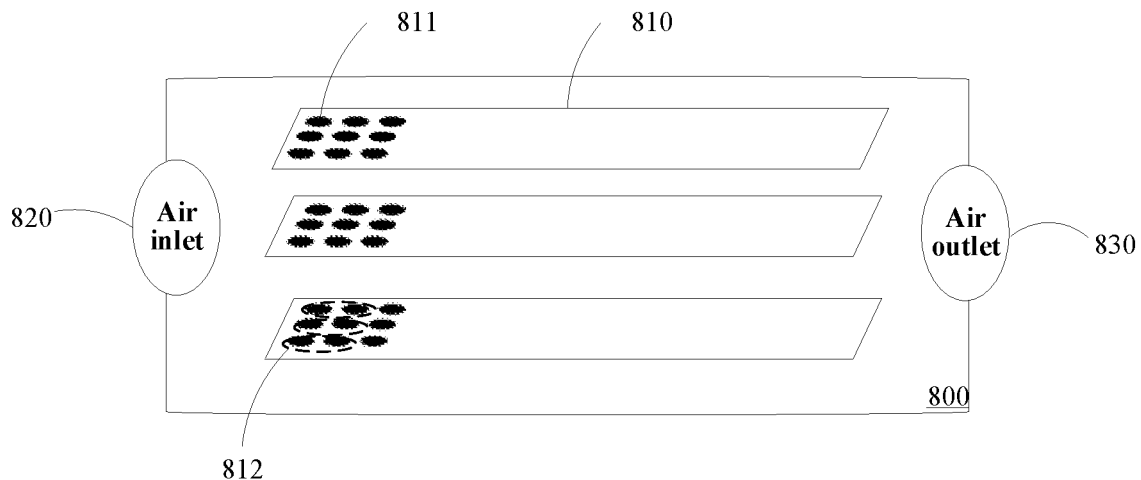
FIG. 1 shows a schematic diagram of a structure of a data processing device.

It is to be noted that in the following implementations illustrated, sometimes the same reference numeral is used in different accompanying drawings to represent the same part of a part with the same function, and repeated illustration thereof is omitted. In the present description, similar reference signs or letters are used for indicating similar items. Therefore, once an item is defined in one accompanying drawing, the item does not need to be further discussed in the subsequent accompanying drawings.

For ease of understanding, the position, size, range, and the bite of each structure shows in the accompanying drawings may not indicate the actual position, size, range, and the like. Therefore, the invention disclosed is not limited to the position, size, range, and the like disclosed in the accompanying drawings. In addition, the accompanying drawings are not necessarily draw to scale, and some features way be enlarged to show details of the particular component.

DETAILED DESCRIPTION

Various exemplary embodiments of the present disclosure are described in detail with reference to the accompanying drawings now. It should be noted that unless illustrated in detail otherwise, the relative deployment of the components and steps, the numerical expressions and the values stated in these embodiments do not limit the scope of the present disclosure.

The following description of at least one exemplary embodiment is merely illustrative, and is not as any limitation to the present disclosure or its application or use. That is, the training method for the parameter configuration model of the data processing device, the parameter configuration method for the data processing device, the parameter configuration device, and the like herein are given in an exemplary manner to illustrate different embodiments of the circuits and the methods in the present disclosure, and do not intend to be limitations. A person skilled is the art will understand that they merely illustrate exemplary rather than exhaustive members in which the present disclosure may be implemented.

The technology, method, and device known to a person of ordinary skill in the related art may not be discussed in detail, but as appropriate circumstances, the technology, method, and device shall be regarded as a part of the authorized description.

With the development of computer technologies, various data processing devices that can be used for super-computing have emerged. Such data processing devices can efficiently carry out activities such as production and research, and can also generate certain benefits in some cases. However, when the computing power of the data processing device increases, the power consumption of the data processing device often increases accordingly, resulting in an increase in computing costs. Therefore, a key to improving performance of the data processing device lies is reducing the power consumption as much as possible while increasing the computing power to reduce a ratio of power consumption to computing power (power consumed per unit of computing power).

As shown in FIG. 1, the data processing device 800 may include one or more hashrate boards 810, and each hashrate board 810 may include a plurality of computing chips 811 arranged in an array. A beat dissipation device (not shown) such as a fan may also be provided in the data processing device 800, and the data processing device 800 may include an air inlet 820 and an air outlet 830, so that airflow can take away heat generated in the data processing device 800.

The power consumption of the data processing device 800 is mainly affected by the following factors. In a case that the required computing power is higher, the working frequency of the computing chip 811 in the data processing device 800 is higher, and the power consumption of the computing chip 811 is correspondingly increased, resulting in an increase in the power consumption of the data processing device 800. Also, in a case that the working frequency of the computing chip 811 increases, the temperature of the computing chip 811 increases correspondingly, thus better heat dissipation is weeded. In this case, the beat dissipation may be improved by heat dissipation means such as increasing a revolving speed of the fan, which usually leads to an increase in the power consumption of the beat dissipation device, resulting in an increase in the power consumption of the data processing device 800. In addition, a change in the power supply voltage of the data processing device 800 may lead to a change in its power consumption. Furthermore, the temperature of the environment where the data processing device 800 located may change. For example, there may be a difference between the environment temperature in the morning and the environment temperature at noon, which may affect the heat dissipation parameter employed by the heat dissipation device in the data processing device 800 (such as the revolving speed of the fan), the temperature difference between different positions of the hashrate board 810, the average temperature of the hashrate board 810, and the like, resulting in a change in the power consumption of the data processing device 800. In conclusion, in the data processing device 800, there are a variety of factors that may affect the ratio of power consumption to computing power thereof, and these factors often have intricate correlations, thus there are great difficulties in precise control of the ratio of power consumption to computing power of the data processing device 800.

In some cases, parameters such as the working frequency of the computing chip 811 in the data processing device 800 and the power supply voltage of the data processing device 800 may be preset. In other words, when the data processing device 800 enters a working state, the above parameters are no longer adjusted.

At this time, is order to ensure normal operation of the data processing device 800, the best dissipation parameter of the data processing device 800 may be adjusted according to the temperature measured by a temperature sensor on the hashrate board 810, so as to maintain the temperature measured by the temperature sensor on the hashrate board 810 at a certain temperature point or within a small temperature range.

However, because the temperature sensor on the hashrate board 810 is usually disposed near the air outlet 830 of the data processing device 800, the size of the area that can be measured by the temperature sensor is limited and the area is prove to be affected by the environment temperature. Therefore, it is actually very difficult to accurately adjust the best dissipation parameter of the heat dissipation device according to this, making it difficult to precisely control the data processing device 800 to have an optimal ratio of power consumption to computing power. In addition, there are many other factors that may affect the ratio of power consumption to computing power, including, for example, the type of the computing chip 811 (which, for example, may be obtained by classifying the computing chips 811 according to parameters such as the performance bin and the leakage current thereof during preliminary tests), the working voltage, the working temperature, the working frequency, the process deviation, she good core ratio (the ratio of a quantity of cores that can work normally to a total quantity of cores in the computing chip 811) of the computing chips 811 and so on. However, in actual circumstances, it is difficult to accurately adjust the operating state of the data processing device 800 according to these factors.

That is, in a case what main operation parameters are preset, it is difficult for the data processing device 800 to make an adaptive adjustment in time according to a change in the environment, thereby making it difficult to achieve the best performance. In addition because there are many factors that may affect the ratio of power consumption to computing power of the data processing device 800 and the factors are often related to each other, it is difficult to summarize a general rule that can help achieve an optimal ratio of power consumption to computing power based on the existing methods.

To this end, the present disclosure provides a training method for a parameter configuration model of a data processing device. In this method, a deep leaning algorithm and a large amount of historical data may be employed in machine learning to establish the parameter configuration model that can reflect a relationship between the operation parameter and the benefit parameter of the data processing device 800. Further, based on the parameter configuration model, the operation parameter of the data processing device 800 may be determined according to the parameter configuration method for the data processing device 800 described below, so as to help achieve as optimized ratio of power consumption to computing power of the data processing device 800.

Figure 2:
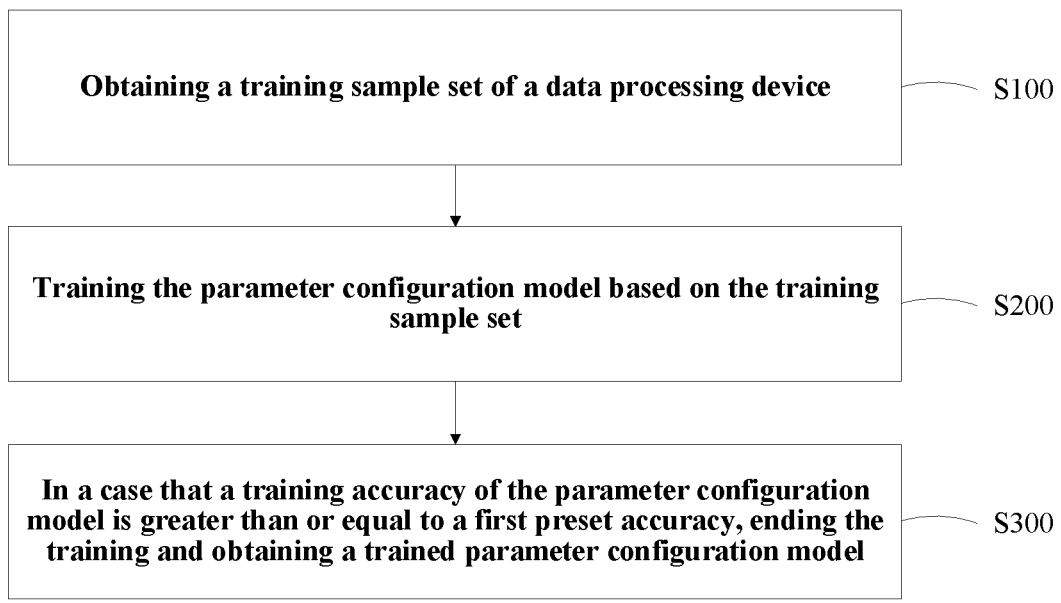
FIG. 2 shows a schematic flowchart of a training method for a parameter configuration model of a data processing device according to an exemplary embodiment of the present disclosure.

As shown in FIG. 2, the training method may include:
step S100, obtaining a training sample set of the data processing device 800.

The training sample set may include the operation parameters and the benefit parameters in one-to-one correspondence with the operation parameters. The operation parameter may be as input (or an input layer) of the braised parameter configuration model, and she benefit parameter may be an output (or an output layer) of the braised parameter configuration model.

In some embodiments, the operation parameter may include at least one of a global operation parameter or a local operation parameter associated with position distribution. The global operations parameter way reflect as overall operating state of the data processing device 800, and is unrelated to a specific position in the data processing device 800. The global operation parameter may include, for example, at least one of an overall working frequency as overall operating temperature, an overall working voltage, a beat dissipation parameter (such as a revolving speed of a cooling fan) of the data processing device 800 or an environment temperature. On the contrary, the local operation parameter may reflect an operating state of's local area or a component is the data processing device 800, and is associated with a specific position in the data processing device 800. The local operation parameter may describe the working state of the data processing device 800 in more details, to help control the data processing device 800 more precisely. The local operation parameter may include, for example, at least one of a chip working frequency, a chap operating temperature, or a chip working voltage of the computing chip 811 in the data processing device 800. It may be understood that in the data processing device 800, computing chips 811 at different positions may have the same or different chip working frequencies, chip operating temperatures, and/or chip working voltages, etc.

In a training process of the parameter configuration model, a matrix/matrices on one or more channels may be employed to represent the operation parameter, that is, the input (the input layer) of the parameter configuration model. A position of a matrix element in the matrix may have a preset correspondence with a position is the data processing device 800, so as to reflect the position distribution feature of the operation parameter.

Taking the data processing device 800 shown in FIG. 1 as an example, it is assumed that the data processing device 800 includes a total of three hashrate boards 810, and each hashrate board 810 includes a total of 108 computing chips 811 arranged in three rows and 36 columns, then a 3×36 matrix/3×36 matrices of one or more channels may be employed to represent the operation parameter.

For the global operation parameter, since it is unrelated to the specific position in the data processing device 800, in a matrix representing a specific global operation parameter, all matrix elements may have the same value. In some embodiments, one global operation parameter may occupy one channel, with one matrix on one channel. In other words, the operation parameter may include a first channel quantity of global parameter matrices. The first channel quantity is equal to a first type quantity of the global operation parameters. For example, five global parameter matrices occupying a total of five channels (each global parameter matrix occupying one channel) may be employed to represent an overall working frequency, an overall operating temperature, an overall working voltage, and a heat dissipation parameter of the data processing device 800 as well as the environment temperature. In a same global parameter matrix, the value of each matrix element is associated with the corresponding global operation parameter. However, considering that in such a matrix, all matrix elements having the same value have a great impact on a subsequent training process, thus the value of the matrix element is usually not directly equal to the value of the corresponding global operation parameter, but a certain conversion operation is needed.

For the local operation parameter, since it is related to a specific position in the data processing device 800, in a local parameter matrix corresponding to one local operation parameter, different matrix elements usually have different values. However, it may be understood that if the local operation parameters at different positions have the same value, then the values of the corresponding matrix elements in the corresponding local parameter matrix are also the same. Each operation parameter of each hashrate board 810 is the data processing device 800 may occupy one channel, with one matrix on one channel. In other words, the operation parameter may include a second channel quantity of local parameter matrices. The second channel quantity is equal to a product of a second type quantity of the local operation parameters and a first quantity of the hashrate boards 810 included in the data processing device 800. For example, nine local parameter matrices occupying a total of 3×3=9 channels (each local parameter matrix occupying one channel) may be employed to respectively represent distribution of chip working frequencies, chip operating temperatures, and chip working voltages of the computing chips 811 on the free hashrate boards 810 in the data processing device 800. In other words, the first frequency local parameter matrix F1, we fast temperature local parameter matrix T1, and the first voltage local parameter matrix U1 may be employed to respectively represent the distributions of the chip working frequencies, the chip operating temperatures, and the chip working voltages of the computing chips on the first hashrate board. In the first frequency local parameter matrix F1, the matrix element F1$ij$ in the $i^{th}$ row and $j^{th}$ column may be employed to represent the chip working frequency f of the computing chip in the $i^{th}$ row and $j^{th}$ column on the first hashrate board. In the first temperature local parameter matrix T1, the matrix element T1$ij$ in the $i^{th}$ row and $j^{th}$ columns may be employed to represent the chip operating temperature t of the computing chip in the $i^{th}$ row and $j^{th}$ columns on the first hashrate board. In the first voltage local parameter matrix U1, the matrix element U1$ij$ in the $i^{th}$ row and $j^{th}$ columns may be employed to represent the chip working voltage u of the computing chip in the $i^{th}$ row and $i^{th}$ column on the first hashrate board. Similarly, the second frequency local parameter matrix F2, the second temperature local parameter matrix 12, and the second voltage local parameter matrix U2 may be used to represent the distributions of the chip working frequencies, the chip operating temperatures, and the chip working voltages of the computing chips on the second hashrate board. Also, the third frequency local parameter matrix F3, the third temperature local parameter matrix T3, and the third voltage local parameter matrix U3 are employed to represent the distributions of the chip working frequencies, the chip operating temperatures, and the chip working voltages of the computing chips on the third hashrate board.

In addition, in some other embodiments, one matrix element in a same local parameter matrix may correspond to a plurality of computing chips at a corresponding position on a same hashrate board. For example, as shown in FIG. 1, one matrix element may be employed to correspond to a chipset 812 formed by two adjacent computing clips 811 on the hashrate board 810. At this time, the value of the matrix element may be associated with the average value of the corresponding chip working parameters of the two adjacent computing chips 811. In this case, dimensions of the matrix participating in the training can be effectively reduced, thereby reducing the amount of computation and improving the training efficiency. Also, compared with a case that only a global operation parameter is considered, the data processing device 800 can be described in more details to obtain a more accurate parameter configuration model.

It may be understood that there may be another correspondence between positions of the matrix elements in the matrix and positions of the commuting chips 811 on the hashrate board 810. For example, when the computing chips 811 are not arranged in a rectangular array on the hashrate board 810, a matrix which can reflect parameter position distribution is the data processing device 800 may also be established similarly, as long as one matrix element in a same local parameter matrix corresponds to one or more computing chips at a corresponding position on a same hashrate board and different matrix elements in a same local parameter matrix respectively correspond to one or more computing chips at different positions on a same hashrate board.

In addition, in some other embodiments, de data processing device 800 may include other quantities of hashrate boards and computing chips, which is not limited to the description is FIG. 1.

The benefit parameter is configured to reflect a ratio of power consumption to commuting power of the data processing device 800. For example, the benefit parameter may include power consumption and computing power of the data processing device 800. Alternatively, the benefit parameter may include the ratio of power consumption to computing power itself of the data processing device 800. It may be understood that in some other embodiments, the benefit parameter may include other physical quantities, as long as the ratio of power consumption to computing power of the data processing device 800 can be obtained based on these physical quantities.

Returning to FIG. 2, the training method further includes:
step S200, training the parameter configuration model based on the training sample set.

In some embodiments, the parameter configuration model may be trained based on the training sample set using a convolutional neural network. The convolutional neural network is a type of feed-forward neural network including convolution computation and having a deep structure, which has a characterization leaning capability and can classify input information in a translation-invariant manner according to its hierarchical structure.

Figure 3:
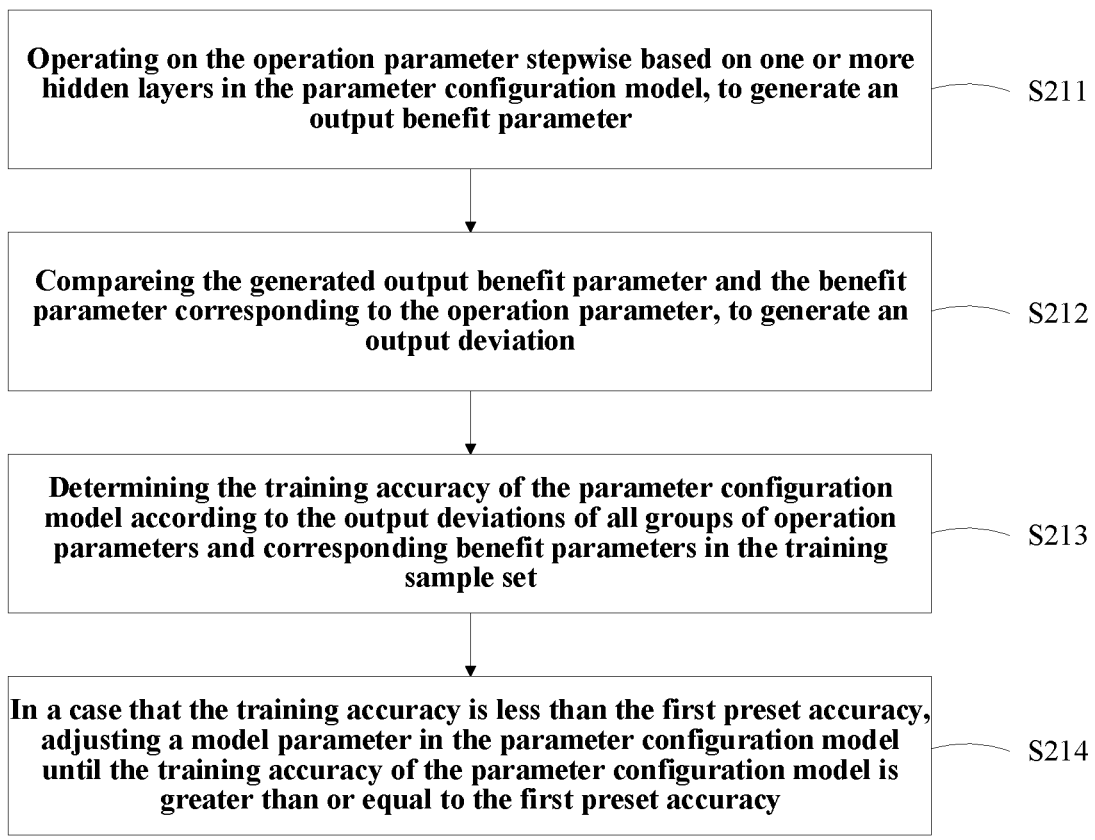
FIG. 3 shows a schematic flowchart of step S200 of a training method in a specific example.

In a specific example, as shown in FIG. 3, step S200 may include:
respectively performing the following operations on each group of operation parameter and corresponding benefit parameter in the training sample set:
step S211, operating on the operation parameter stepwise based on one or more hidden layers in the parameter configuration model, to generate an output benefit parameter;
step S212, comparing the generated output benefit parameter and the benefit parameter corresponding to the operation parameter, to generate an output deviation.

The hidden layers may include at least one convolutional layer, and the hidden layers may further include a pooling layer and/or a fully-connected layer.

The convolutional layer may be formed from several convolutional units, and a parameter of each convolutional wait may be optimized and obtained by, for example, a back propagation algorithm, etc. An objective of convolution operation is to exact different features of the input. The first convolutional lye may only extract some low-level features, while wore convolutional layers may iteratively extract more complex features from the low-level features.

The pooling layer may be a form of down-sampling, and there are many different forms of non-linear pooling functions. The pooling layer may continuously reduce a spatial size of the data, so that a quantity of parameters and an amount of computation may decrease. This also controls overfitting to some extent. In some embodiments, the pooling layer may be periodically inserted between the convolutional layers.

In the convolutional neural network structure, after a plurality of the convolutional and pooling layers, one or more fully connected layers may be connected. Each neuron in the fully-connected layer is fully connected to all neurons in its previous layer, and the fully-connected layer may integrate local information with category distinction in the convolutional layer or the pooling layer. After the above steps, for the operation parameter in each group of sample is the training sample set, a corresponding output benefit parameter and as output deviation may be obtained.

Further, step S200 may include:
step S213, determining a training accuracy of the parameter configuration model according to the output deviations of all groups of operation parameters and corresponding benefit parameters in the training sample set; and
step S214, in a case that the training accuracy is less than a first preset accuracy, adjusting a model parameter in the parameter configuration model until the training accuracy of the parameter configuration model is greater than or equal to the first preset accuracy.

Figure 4:
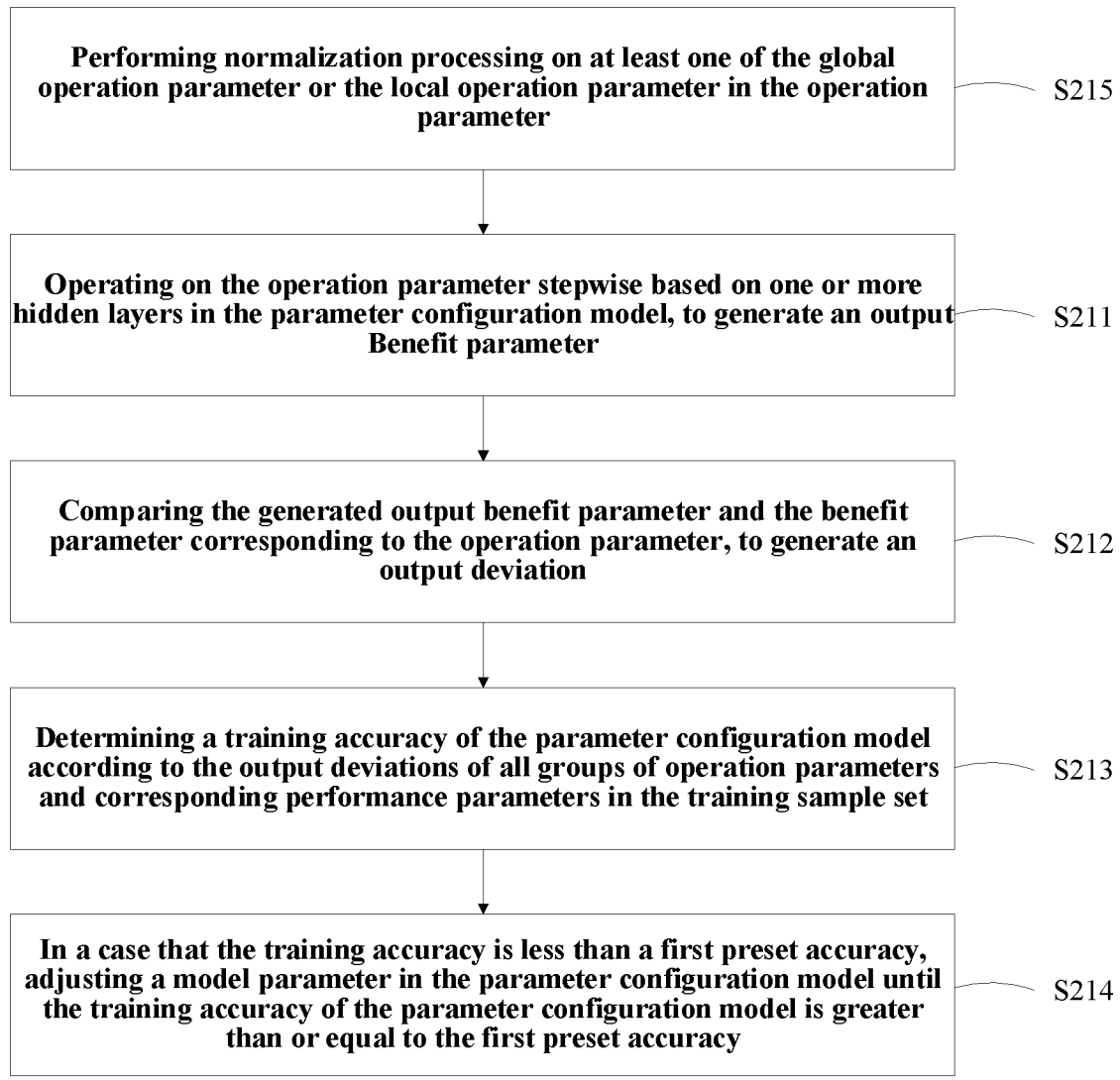
FIG. 4 shows a schematic flowchart of step S200 of a training method in another specific example.

According to another example of the present disclosure, as shown in FIG. 4, before step S211, step S215, performing normalization processing on at least one of the global operation parameter or the local operation parameter is the operation parameter, may also be performed.

This is because in actual circumstances, value ranges of different parameters often have great differences, and the global operation parameter usually has a greater impact on training than the local operation parameter, to avoid excessive impact of a certain parameter and to bely achieve more accurate and efficient training, normalization processing may be performed on st least one of a global parameter matrix or a local parameter matrix involved.

Figure 5:
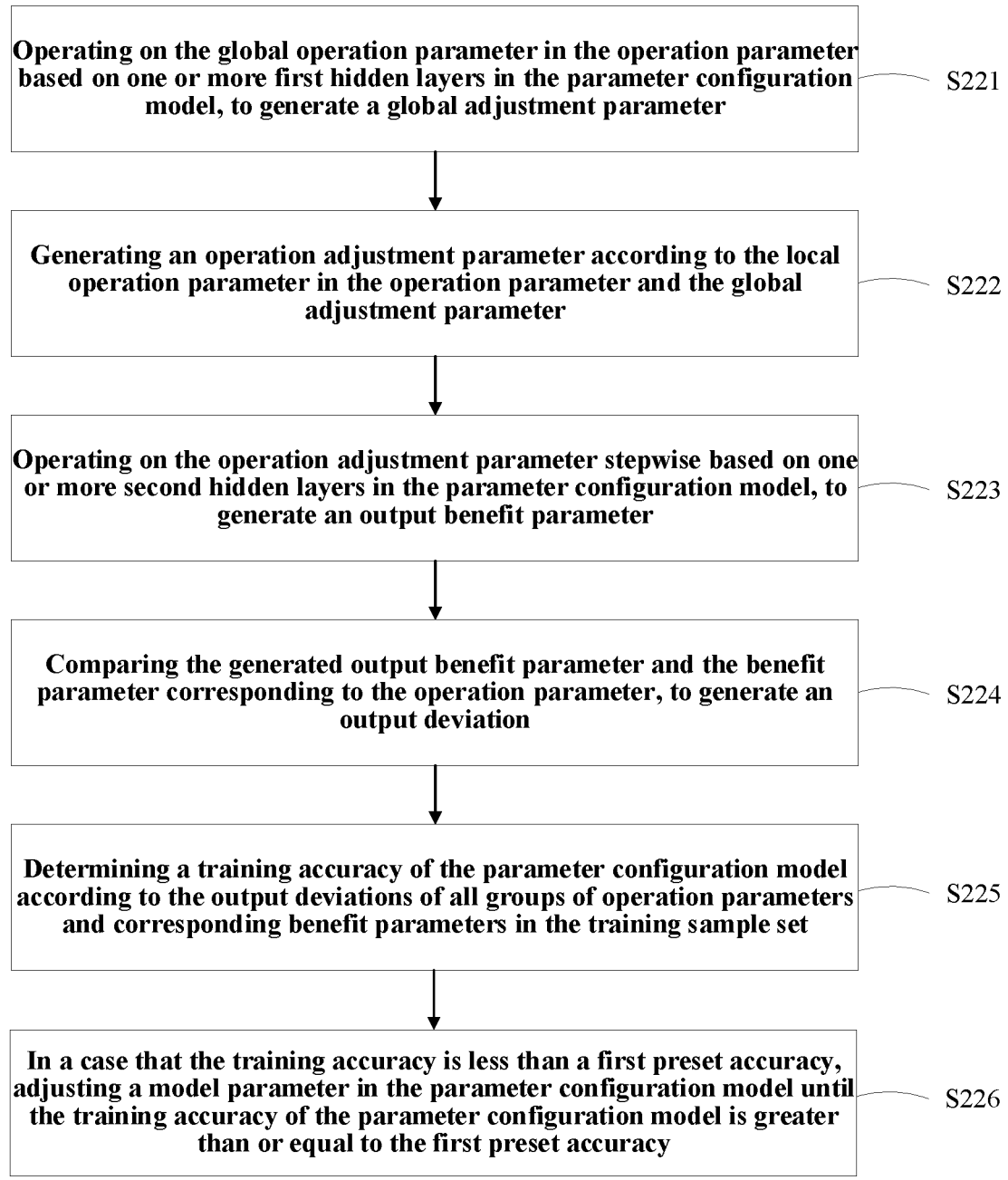
FIG. 5 shows a schematic flowchart of step S200 of a training method is still another specific example.

In another specific example of the present disclosure, as shown in FIG. 5, step S200 may include:
- respectively performing the following operations on each group of operation parameter and corresponding benefit parameter in the training sample set:
- step S221, operating on the global operation parameter in the operation parameter stepwise based on one or more first hidden layers in the parameter configuration model, to generate a global adjustment parameter;
- step S222, generating an operation adjustment parameter according to the local operation parameter in the operation parameter and the global adjustment parameter;
- step S223, operating on the operation adjustment parameter stepwise based on one or more second hidden layers in the parameter configuration model, to generate an output benefit parameter;
- step S224, comparing the generated output benefit parameter and the benefit parameter corresponding to the operation parameter, to generate an output deviation.

The first hidden layer may include a convolutional layer, and the convolutional layer is employed to pre-process the global operation parameter in the operation parameter, so as to automatically determine the weight of the global operation parameter in the operation parameter based on machine learning, to optimize the training of the parameter configuration model. The global adjustment parameter generated by the first bidden layer is combined with the local operation parameter in the operation parameter to form an operation adjustment parameter, and the operation adjustment parameter may be used in subsequent training.

The second hidden layer may include one or more convolutional layers, and the second hidden layer may also include a pooling layer and a fully connected layer.

After the above steps, for an operation parameter in each group of sample in the training sample set, a corresponding output benefit parameter and an output deviation may be obtained.

Further, step S200 may further include:
- step S225, determining a training accuracy of the parameter configuration model according to the output deviations of all groups of operation parameters and corresponding benefit parameters in the training sample set; and
- step S226, in a case that the training accuracy is less than a first preset accuracy, adjusting a model parameter in the parameter configuration model until the training accuracy of the parameter configuration model is greater than or equal to the first preset accuracy.

Figure 6:
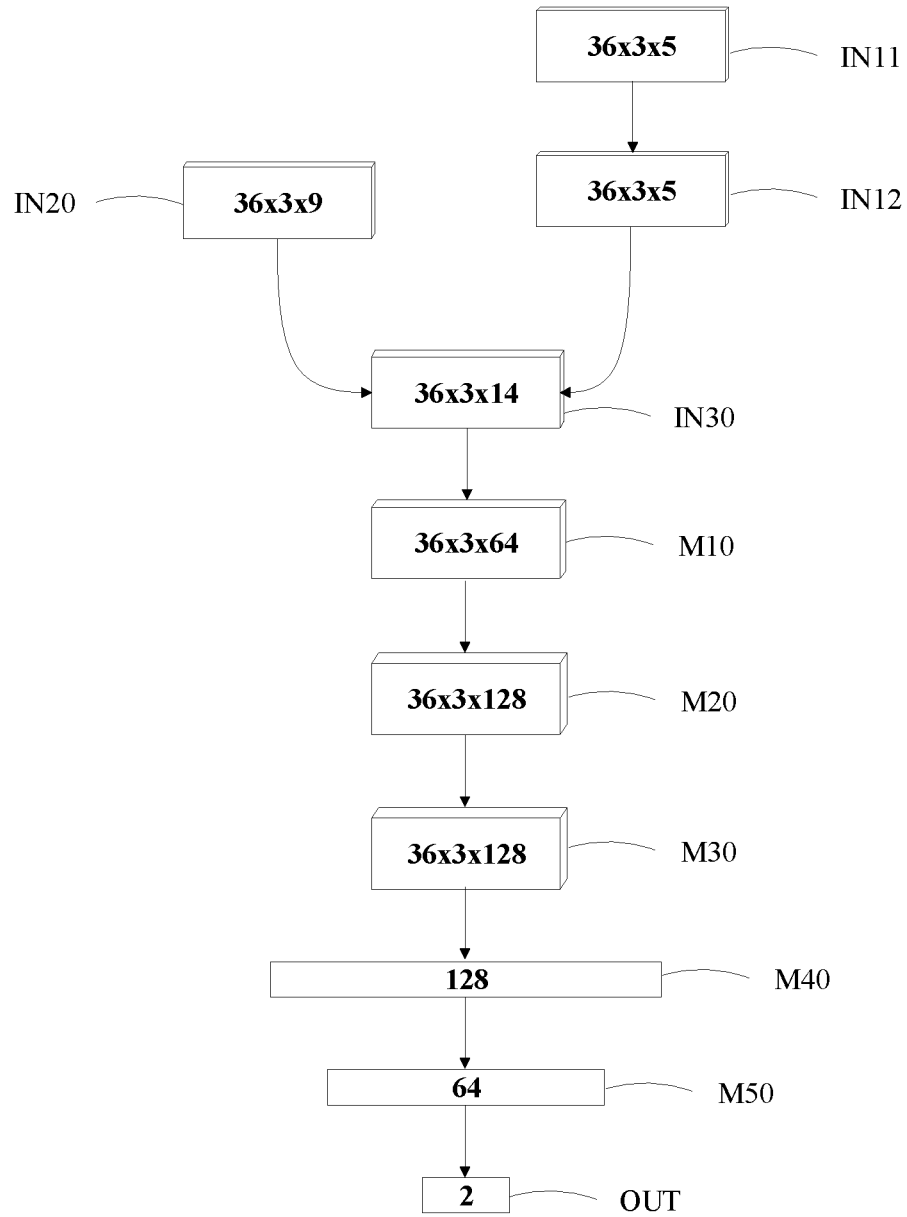
FIG. 6 shows a schematic diagram of framing a parameter configuration model in a specific example.

FIG. 6 is a schematic diagram showing training for the data processing device 800 in FIG. 1. The global operation parameter may include 36×3 matrices on five channels to respectively represent the overall working frequency, the overall operating temperature, the overall working voltage, and the heat dissipation parameter of the data processing device 800 as well as the environment temperature, as the first input IN11. All matrix elements in a same matrix have a same value. After the first input IN11 passes through one or more convolutional layers (a first hidden layer), the second input IN12 is generated. The second input IN12 may also include 36×3 matrices on five channels, which may be considered as the normalized global operation parameter. Then, the second input IN12 may be combined with the local operation parameter IN20 (36×3 matrices on nine channels to respectively represent distributions of the chip working frequencies, the chip operating temperatures, and the chip working voltages of the computing chips 811 on three hashrate boards 810) in the operation parameter to form 36×3 matrices on 14 channels, as the operation adjustment parameter IN30. Then the operation adjustment parameter IN30 may pass through one or more convolutional layers to generate intermediate parameters M10, M20, and M30 in sequence, then passes through one or more pooling layers to generate intermediate parameters M40 and M50 in sequence, and finally the intermediate parameter M50 may pass through a fully connected layer to generate an output benefit parameter OUT (which, for example, may include computing power and power consumption of the data processing device 800).

Returning to FIG. 2, the training method of the present disclosure way further include:
- step S300, in a case that the training accuracy of the parameter configuration model is greater than or equal to the first preset accuracy, ending the training and obtaining the trained parameter configuration model.

The first preset accuracy may be set according to needs. Generally, a greater first preset accuracy being required indicates more time and historical data for training and higher training costs.

Figure 7:
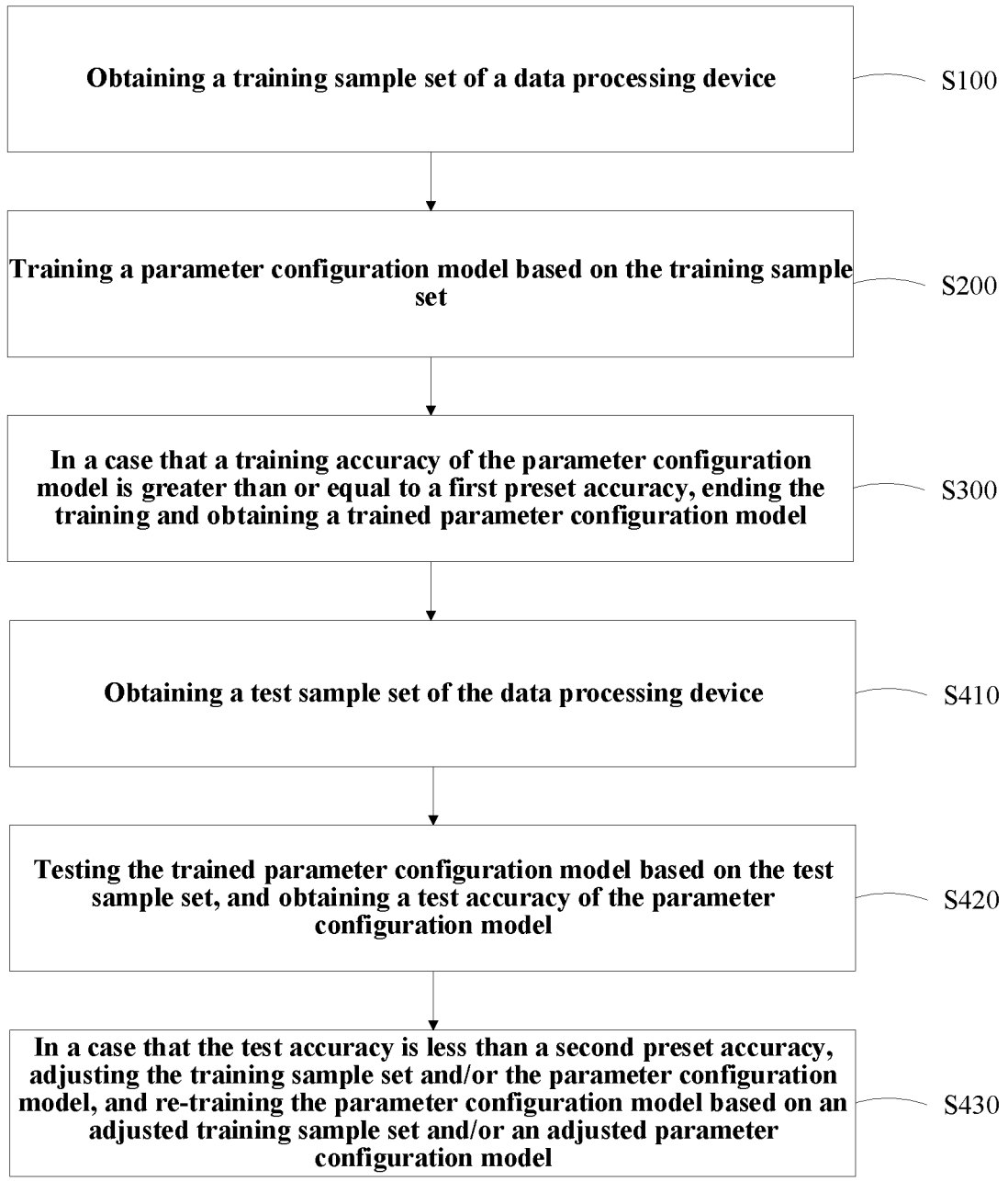
FIG. 7 shows a schematic flowchart of a training method for a parameter configuration model of a data processing device according to another exemplary embodiment of the present disclosure.

As shown in FIG. 7, the training method of the present disclosure may further include:
- step S410, obtaining a test sample set of the data processing device.

The test sample set may include operation parameters and benefit parameters in one-to-one correspondence with the operation parameters, and the groups of operation parameters and corresponding benefit parameters in the test sample set are different from those in the training sample set, so as to test the parameter configuration model by using different data to obtain a more accurate test result.

Returning to FIG. 7, the waiving method may further include:
- step S420, testing the trained parameter configuration model based on the fest sample set, and obtaining the test accuracy of the parameter configuration model; and
- step S430, in a case that the test accuracy is less than a second preset accuracy, adjusting the training sample set and for the parameter configuration model, and re-training the parameter configuration model based on the adjusted training sample set and/or the adjusted parameter configuration model.

By testing the parameter configuration model, as effect of the model can be monitored and adjusted is time to implement better parameter configuration.

It should be noted that in a specific example discussed in this application, some parameters (for example, positions of the air inlet and the air outlet, etc.) are not directly represented is the matrix, but they generally have a certain impact on the power consumption of the data processing device 800, thus the data processing devices 800 using the same parameter configuration model should usually have the similar structures and arrangements. It may be understood that if the structure or arrangement in the data processing device 800 changes, it is generally necessary to train a corresponding parameter configuration model according to this specific type of data processing device 800. For example, assuming that the positions of the air inlet 820 and the air outlet 830 shown in FIG. 1 are respectively changed to be at an upper part and a lower part of the data processing device 800, it is necessary to otherwise train the parameter configuration model according to the training method described in the present disclosure, instead of directly using the parameter configuration model trained according to the data processing device 800 described in FIG. 1.

Figure 8:
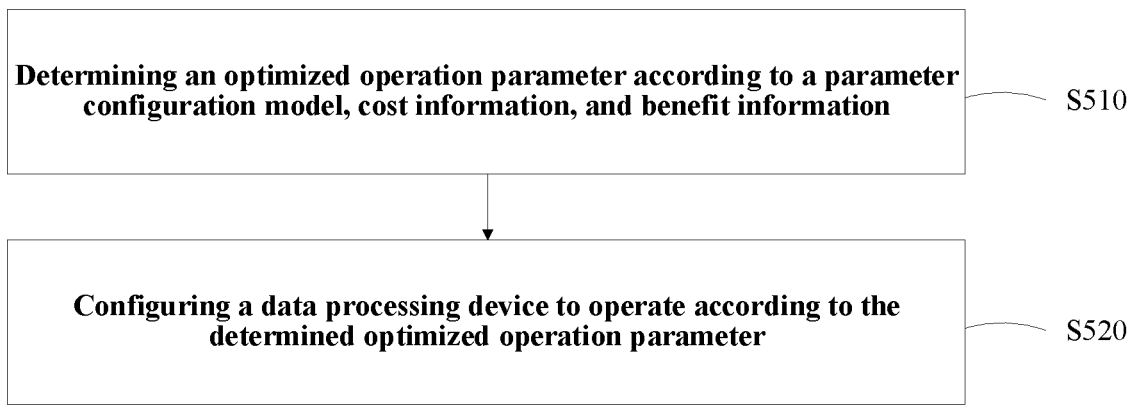
FIG. 8 shows a schematic flowchart of a parameter configuration method for a data processing device according to an exemplary embodiment of the present disclosure.

A parameter configuration method for a data processing device is further provided in the present disclosure. As shown is FIG. 8, the parameter configuration method may include:

step S510, determining as optimized operation parameter according to a parameter configuration model, cost information, and benefit information.

The parameter configuration model may include the parameter configuration model trained by using the foregoing training method. In some embodiments, the cost information may include an electricity price, and the benefit information may include a price of rights and interests generated by the computing power.

In a specific example, a plurality groups of operation parameters with values within a preset range may be provided; for each group of operation parameter, a benefit parameter corresponding to the group of operation parameter is computed according to the parameter configuration model, the cost information, and the benefit information; and an operation parameter corresponding to a maximum benefit parameter is determined as the optimized operation parameter.

Returning to FIG. 8. The parameter configuration method way further include:

step S520, configuring the data processing device to operate according to the determined optimized operation parameter.

In addition, in a exemplary embodiment of the present disclosure, during working of the data processing device, de optimized operation parameter may be determined according to the parameter configuration model, the cost information, and the benefit information, and the data processing device may be adjusted to operate according to the determined optimized operation parameter instead of always operating according to a preset operation parameter.

Based on the parameter configuration model trained by the training method of the present disclosure, the general rule of the data processing device having the similar structure or arrangement can be summarized from a large amount of historical data, to facilitate precise control of the operation of the data processing device. In addition the involved operation parameter in the data processing device can be adjusted during operation, so that a problem of weak adaptability is resolved.

Figure 9:
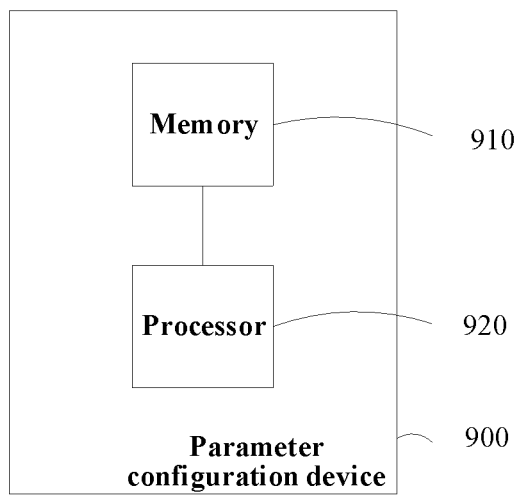
FIG. 9 shows a schematic diagram of a parameter configuration device according to an exemplary embodiment of the present disclosure.

According to a third aspect of the present disclosure, a parameter configuration device is provided. The parameter configuration device may be integrally arranged with the data processing device, or may be arranged independent from the data processing device. As shown in FIG. 9, the parameter configuration device 900 may include a memory 910, a processor 920, and instructions stored in the memory 910. When the instructions are executed by the processor 920, steps of the foregoing training method and/or steps of the foregoing parameter configuration method are implemented. The parameter configuration device used for implementing the training method and the parameter configuration device used for implementing the parameter configuration method may be the same device or different devices.

The processor 920 may perform various actions and processing according to the instructions stored in the memory 910. Specifically, the processor 920 may be an integrated circuit chip with a signal processing capability. The foregoing processor may be a general-purpose processor, a digital signal processor (DSP), an application-specific integrated circuit (ASIC), a held programmable gate array (FPGA) or another programmable logic device, a discrete gate or a transistor logic device, or a discrete hardware component. The methods, steps, and logic block diagrams that are disclosed in the embodiments of the present disclosure may be implemented or performed. The general-purpose processor may be a microprocessor, or the processor may be any conventional processor or the life, or may be an X810 architecture, as ARM architecture, or the like.

The memory 910 has executable instructions stored therein. The instructions are executed by the processor 920 so implement the foregoing training method and/or parameter configuration method. The memory 910 may be a volatile memory or a non-volatile memory, or may include both volatile and non-volatile memories. The non-volatile memory may be a read-only memory (ROM), a programmable read-only MANNY (PROM), au erasable programmable read-only memory (EPROM), as electrically erasable programmable read-only memory (EEPROM), or a flash memory. The volatile memory may be a random access memory (RAM) and is used as an external cache. Through illustrative but not limited description, many forms of RAMs are available, for example, a static random (SRAM), a dynamic random access memory (DRAM), a synchronous dynamic random access memory (SDRAM), a double data rate synchronous dynamic random access memory (DDRS-DRAM), as enhanced synchronous dynamic random access memory (ESDRAN), a synchronous link dynamic random access memory (SLDRAM), and a direct rambus random access memory (DR RAM). It should be noted that the memories of the method described herein are intended to include but are not limited to these and any other suitable types of memories.

According to a fourth aspect of the present disclosure, a non-transitory computer-readable storage medium with instructions stored thereon is provided. When the instructions are executed by a processor, steps of the foregoing training method and/or steps of the foregoing parameter configuration method are implemented.

Similarly, the non-transitory computer-readable storage medium in the embodiments of the present disclosure may be a volatile memory or a non-volatile memory, or may include both volatile and non-volatile memories. It should be noted that the computer-readable storage medium described herein include but are not limited to these and any other suitable types of memories.

According to a fifth aspect of the present disclosure, a computer program product is provided. The computer program product may include instructions. When the instructions are executed by a processor, steps of the foregoing framing method and/or steps of the foregoing parameter configuration method are implemented.

The instructions may be any instruction set to be executed directly, such as machine code, or any instruction set to be executed indirectly, such as scripts, by one or more processors. The terms "instruction", "application", "process", "step", and "program" may be used interchangeably herein. The instructions may be stored in an object code format for direct processing by one or more processors, or stored in any other computer language including scripts or collections of independent source code modules that are interpreted on demand or compiled in advance. The instructions may include instructions that cause, for example, one or more processors to function as various neural networks herein. The functions, methods, and routines of the instructions are described in more details in elsewhere herein.

In addition, the implementation of the present disclosure may also include the following examples:

1. A warning method for a parameter configuration model of a data processing device, including:
   obtaining a training sample set of the data processing device, wherein the training sample set includes operation parameters and benefit parameters in one-to-one correspondence with the operation parameters, the operation parameter includes at least one of a global operation parameter or a local operation parameter associated with position distribution, and the benefit parameter is configured to reflect a ratio of power consumption to computing power of the data processing device;
   training the parameter configuration model based on the training sample set, wherein the operation parameter is configured as an input of the parameter configuration model, and the benefit parameter is configured as an output of the parameter configuration model; and
   in a case that a framing accuracy of the parameter configuration model is greater than or equal to a first preset accuracy, ending the training and obtaining a trained parameter configuration model.
2. The training method according to item 1, wherein the operation parameter includes a global parameter matrix, wherein each matrix element in a same global parameter matrix has a same value associated with a corresponding global operation parameter.
3. The training method according to item 2, wherein the operation parameter includes a first channel quantity of global parameter matrices, wherein the first channel quantity is equal to a first type quantity of the global operation parameters.
4. The training method according to item 2, wherein the global operation parameter includes at least one of an overall working frequency, an overall operating temperature, an overall working voltage, a heat dissipation parameter of the data processing device or an environment temperature.
5. The training method according to item 1, wherein the operation parameter includes a local parameter matrix, wherein a matrix element in the local parameter matrix has a value associated with a corresponding local operation parameter at a position corresponding to the matrix element in the data processing device.
6. The training method according to item 5, wherein the data processing device includes a fest quantity of hashrate boards, each hashrate board includes a plurality of computing chips arranged in an array, one matrix element in a same local parameter matrix corresponds to one or more computing chips at a corresponding position on a same hashrate board, and different matrix elements in the same local parameter matrix respectively correspond to one or more computing chips at different positions on the same hashrate board.
7. The training method according to item 6, wherein the operation parameter includes a second channel quantity of local parameter matrices, wherein the second channel quantity is equal to a product of a second type quantity of the local operation parameters and the first quantity.
8. The training method according to item 6, wherein the matrix element in the same local parameter matrix has a value associated with a chip operation parameter of one or more computing chips at the position corresponding to the matrix element in the same hashrate board.
9. The training method according to item 8, wherein the chip operation parameter includes at least one of a chip working frequency, a chip operating temperature, or a chip working voltage of the computing chip is the data processing device.
10. The waiving method according to item 1, wherein the benefit parameter includes power consumption and computing power of the data processing device; or
    the benefit parameter includes the ratio of power consumption to computing power of the data processing device.
11. The training method according to item 1, wherein the parameter configuration model is trained based on the training sample set according to a convolutional neural network.
12. The training method according to item 1, wherein training the parameter configuration model based on the training sample set includes:
    respectively performing the following operations on each group of operation parameter and corresponding benefit parameter in the training sample set:
       operating on the operation parameter stepwise based on one or more hidden layers in the parameter configuration model, to generate an output benefit parameter, and
       comparing the generated output benefit parameter and the benefit parameter corresponding to the operation parameter, to generate as output deviation;
    determining the training accuracy of the parameter configuration model according to the output deviations of all groups of operation parameters and corresponding benefit parameters in the training sample set; and
    in a case that the training accuracy is less than the first preset accuracy, adjusting a model parameter is the parameter configuration model until the training accuracy of the parameter configuration model is greater than or equal to the first preset accuracy.
13. The training method according to item 12, wherein training the parameter configuration model based on the training sample set further includes:
    before operating on the operation parameter stepwise based on one or more hidden layers in the parameter configuration model, performing normalization processing on at least one of the global operation parameter or the local operation parameter in the operation parameter.
14. The training method according to item 1, wherein training the parameter configuration model based on the training sample set includes;
    respectively performing the following operations on each group of operations parameter and corresponding benefit parameter in the training sample set:
       operating on the global operation parameter is the operation parameter stepwise based on one or more fest hidden layers in the parameter configuration model, to generate a global adjustment parameter;

generating an operation adjustment parameter according to the local operation parameter in the operation parameter and the global adjustment parameter;

operating on the operation adjustment parameter stepwise based on one or more second hidden layers is the parameter configuration model, to generate an output benefit parameter; and comparing the generated output benefit parameter and the benefit parameter corresponding to the operation parameter, to generate an output deviation;

determining the training accuracy of the parameter configuration model according to the output deviations of all groups of operation parameters and corresponding benefit parameters in the training sample set; and in a case that the training accuracy is less than the first preset accuracy, adjusting a model parameter in the parameter configuration model until the training accuracy of the parameter configuration model is greater than or equal to the first preset accuracy.

15. The training method according to item 1, further including:

obtaining a test sample set of the data processing device, wherein the test sample set includes operation parameters and benefit parameters in one-to-one correspondence with the operation parameters, and groups of operation parameters and corresponding benefit parameters is the test sample set are different from groups of operation parameters and corresponding benefit parameters in the training sample set;

testing the trained parameter configuration model based on the test sample set, and obtaining a test accuracy of the parameter configuration model; and in a case that the test accuracy is less than a second preset accuracy, adjusting the training sample set and/or the parameter configuration model, and re-training the parameter configuration model based on an adjusted taming sample set and/or an adjusted parameter configuration model.

16. A parameter configuration method for a data processing device, including:

determining an optimized operations parameter according to a parameter configuration model, cost information, and benefit information, wherein the parameter configuration model includes a parameter configuration model trained by using the training method according to any one of items 1 to 15; and configuring the data processing device to operate according to the determined optimized operation parameter.

17. The parameter configuration method according to item 16, wherein determining the optimized operation parameter according to the parameter configuration model, the cost information, and the benefit information includes:

providing a plurality groups of operation parameters with values within a preset range;

for each group of operation parameters, computing, according to the parameter configuration model, the cost information, and the benefit information, a benefit parameter corresponding to the group of operation parameters; and determining an operation parameter corresponding to a maximum benefit parameter as the optimized operation parameter.

18. The parameter configuration method according to item 16, wherein the cost information includes an electricity price; and the benefit information includes a price of rights and interests generated by computing power.

19. The parameter configuration method according to item 16, wherein during working of the data processing device, the optimized operation parameter is determined according to the parameter configuration model, the cost information, and the benefit information, and the data processing device is adjusted to operate according to the determined optimized operation parameter.

20. A parameter configuration device, including a memory, a processor, and instructions stored on the memory, wherein when the instructions are executed by the processor, steps of the training method according to any one of items 1 to 15 and/or steps of the parameter configuration method according to any one of items 16 to 19 are implemented.

21. A wow-transitory computer-readable storage medium, having instructions stored thereon, wherein when the instructions are executed by a processor, steps of the training method according to any one of items 1 to 15 and/or steps of the parameter configuration method according to any one of items 16 to 19 are implemented.

22. A computer program product, including instructions, wherein when the instructions are executed by a processor, steps of the training method according to any one of items 1 to 15 and/or steps of the parameter configuration method according to any one of items 16 to 19 are implemented.

In all the examples shown and discussed herein, any specific value should be construed as merely illustrative and not as a limitation. Therefore, other examples of exemplary embodiments may have different values.

The words "front", "rear", "top", "bottom", "over", "under", and the like in the description and in the claims, if any, are used for descriptive purposes and not necessarily for describing unchanged relative positions. It should be understood that the words used in such a way are interchangeable under appropriate circumstances so that the embodiments of the present disclosure described herein, for example, can be operated in other orientations that are different from those shown herein or those described otherwise.

As used herein, the word "exemplary" means "serving as an example, instance, or illustration" rather than as a "model" to be exactly reproduced. Any implementation exemplarily described herein is not necessarily to be explained as preferred or advantageous over other implementations. In addition, the present disclosure is not limited by any stated or implied theory provided is the above technical field, background, summary or detailed description.

As used herein, the word "substantially" means that any minor variation caused by the deflect of the design or manufacture, the tolerance of the device or the element, the environmental influence, and/or other factors is included. The word "substantially" also allows for the difference from the perfect or ideal situation caused by the parasitic effect, noise, and other practical considerations that may exist is the actual implementation.

Elements, nodes, or features that are "connected" or "coupled" together may be indicated in the foregoing description. As used herein, unless expressly stated otherwise, "connect" means that one element node/feature is directly connected to (or directly communicate with) another element node/feature electrically, mechanically, logically, or in other manners. Similarly, unless expressly stated otherwise, "couple" me what one element rode feature may be directly or indirectly linked with another element/node/feature mechanically, electrically, logically, or in other owners, to allow an interaction, even though the two features may not be directly connected. That is, "couple" intends to include both direct and indirect links of the element or other features, including the connections using one or more intermediate elements.

It should be further understood that the word "comprise/include", when used herein, specifies the presence of indicated features, integers, steps, operations, waits, and/or components, but does not preclude the presence on addition of one or more other features, integers, steps, operations, units, and/or components, and/or combinations thereof.

A person skilled in the art should realize that the boundary between the foregoing operations is merely illustrative. A plurality of operations may be combined into a single operation, and the single operation may be distributed among additional operations, and the operations may be performed at least partially overlap in time. In addition, alternative embodiments may include plurality of instances of a particular operation, and the operation order may be changed in other various embodiments. However, other modifications, changes, and replacements are also possible. Therefore, the description and accompanying drawings are to be regarded as illustrative rather than limited.

What is claimed is:

1. A training method for a parameter configuration model of a data processing device, the data processing device comprising a plurality of hashrate boards, each hashrate board comprising a plurality of computing chips arranged in an array, the training method comprising:
    obtaining a training sample set of the data processing device, wherein the training sample set comprises operation parameters and benefit parameters in one-to-one correspondence with the operation parameters, the operation parameter comprises a global operation parameter and a local operation parameter associated with position distribution, each global parameter matrix is used for representing only one type of global operation parameter, each local parameter matrix is used for representing only one type of chip operation parameter on only one hashrate board, each matrix element in the local parameter matrix has a value associated with the one type of chip operation parameter of one or more computing chips at a corresponding position on the one hashrate board respectively, and the benefit parameter is configured to reflect a ratio of power consumption to computing power of the data processing device;
    training the parameter configuration model based on the training sample set, wherein the operation parameter is configured as an input of the parameter configuration model, and the benefit parameter is configured as an output of the parameter configuration model; and
    in a case that a training accuracy of the parameter configuration model is greater than or equal to a first preset accuracy, ending the training and obtaining a trained parameter configuration model.

2. The training method according to claim 1, wherein each matrix element in a same global parameter matrix has a same value associated with a corresponding global operation parameter.

3. The training method according to claim 2, wherein the operation parameter comprises a first channel quantity of global parameter matrices, wherein the first channel quantity is equal to a first type quantity of the global operation parameters.

4. The training method according to claim 2, wherein the global operation parameter comprises at least one of an overall working frequency, an overall operating temperature, an overall working voltage, a heat dissipation parameter of the data processing device or an environment temperature.

5. The training method according to claim 1, wherein the data processing device comprises a first quantity of hashrate boards,
    the operation parameter comprises a second channel quantity of local parameter matrices, wherein the second channel quantity is equal to a product of a second type quantity of the local operation parameters and the first quantity.

6. The training method according to claim 1, wherein the chip operation parameter comprises at least one of a chip working frequency, a chip operating temperature, or a chip working voltage.

7. The training method according to claim 1, wherein the benefit parameter comprises power consumption and computing power of the data processing device; or
    the benefit parameter comprises the ratio of power consumption to computing power of the data processing device.

8. The training method according to claim 1, wherein the parameter configuration model is trained based on the training sample set according to a convolutional neural network.

9. The training method according to claim 1, wherein training the parameter configuration model based on the training sample set comprises:
    respectively performing the following operations on each group of operation parameter and corresponding benefit parameter in the training sample set:
        operating on the operation parameter stepwise based on one or more hidden layers in the parameter configuration model, to generate an output benefit parameter;
        comparing the generated output benefit parameter and the benefit parameter corresponding to the operation parameter, to generate an output deviation;
    determining the training accuracy of the parameter configuration model according to the output deviations of all groups of operation parameters and corresponding benefit parameters in the training sample set; and
    in a case that the training accuracy is less than the first preset accuracy, adjusting a model parameter in the parameter configuration model until the training accuracy of the parameter configuration model is greater than or equal to the first preset accuracy.

10. The training method according to claim 9, wherein training the parameter configuration model based on the training sample set further comprises:
    before operating on the operation parameter stepwise based on one or more hidden layers in the parameter configuration model, performing normalization processing on at least one of the global operation parameter or the local operation parameter in the operation parameter.

11. A parameter configuration device, comprising a memory, a processor, and instructions stored in the memory, wherein when the instructions are executed by the processor, steps of the parameter configuration method according to claim 10 are implemented.

12. A non-transitory computer-readable storage medium, having instructions stored thereon, wherein when the instructions are executed by a processor, steps of the parameter configuration method according to claim 10 are implemented.

13. The training method according to claim 1, wherein training the parameter configuration model based on the training sample set comprises:
respectively performing the following operations on each group of operation parameter and corresponding benefit parameter in the training sample set:
operating on the global operation parameter in the operation parameter stepwise based on one or more first hidden layers in the parameter configuration model, to generate a global adjustment parameter;
generating an operation adjustment parameter according to the local operation parameter in the operation parameter and the global adjustment parameter;
operating on the operation adjustment parameter stepwise based on one or more second hidden layers in the parameter configuration model, to generate an output benefit parameter; and
comparing the generated output benefit parameter and the benefit parameter corresponding to the operation parameter, to generate an output deviation;
determining the training accuracy of the parameter configuration model according to the output deviations of all groups of operation parameters and corresponding benefit parameters in the training sample set; and
in a case that the training accuracy is less than the first preset accuracy, adjusting a model parameter in the parameter configuration model until the training accuracy of the parameter configuration model is greater than or equal to the first preset accuracy.

14. The training method according to claim 1, further comprising:
obtaining a test sample set of the data processing device, wherein the test sample set comprises operation parameters and benefit parameters in one-to-one correspondence with the operation parameters, and groups of operation parameters and corresponding benefit parameters in the test sample set are different from groups of operation parameters and corresponding benefit parameters in the training sample set;
testing the trained parameter configuration model based on the test sample set, and obtaining a test accuracy of the parameter configuration model; and
in a case that the test accuracy is less than a second preset accuracy, adjusting the training sample set and/or the parameter configuration model, and re-training the parameter configuration model based on an adjusted training sample set and/or an adjusted parameter configuration model.

15. A parameter configuration method for a data processing device, comprising:
determining an optimized operation parameter according to a parameter configuration model, cost information, and benefit information, wherein the parameter configuration model comprises a parameter configuration model trained by using the training method according to claim 1; and
configuring the data processing device to operate according to the determined optimized operation parameter.

16. The parameter configuration method according to claim 15, wherein determining the optimized operation parameter according to the parameter configuration model, the cost information, and the benefit information comprises:
providing a plurality groups of operation parameters with values within a preset range;
for each group of operation parameters, computing, according to the parameter configuration model, the cost information, and the benefit information, a benefit parameter corresponding to the group of operation parameters; and
determining an operation parameter corresponding to a maximum benefit parameter as the optimized operation parameter.

17. The parameter configuration method according to claim 15, wherein the cost information comprises an electricity price; and
the benefit information comprises a price of rights and interests generated by computing power.

18. The parameter configuration method according to claim 15, wherein during working of the data processing device, the optimized operation parameter is determined according to the parameter configuration model, the cost information, and the benefit information, and the data processing device is adjusted to operate according to the determined optimized operation parameter.

19. A parameter configuration device, comprising a memory, a processor, and instructions stored in the memory, wherein when the instructions are executed by the processor, steps of the training method according to claim 1 are implemented.

20. A non-transitory computer-readable storage medium, having instructions stored thereon, wherein when the instructions are executed by a processor, steps of the training method according to claim 1 are implemented.

* * * * *